United States Patent
Wolf

(10) Patent No.: US 7,295,149 B1
(45) Date of Patent: Nov. 13, 2007

(54) METHOD FOR DETERMINING MISSILE INFORMATION FROM RADAR RETURNS

(75) Inventor: David E. Wolf, Holland, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/253,309

(22) Filed: Oct. 19, 2005

(51) Int. Cl.
   *G01S 13/04* (2006.01)
(52) U.S. Cl. ................................................. 342/90
(58) Field of Classification Search ............. 342/90
   See application file for complete search history.

(56) References Cited

U.S. PATENT DOCUMENTS

| | | | | |
|---|---|---|---|---|
| 3,733,603 A | * | 5/1973 | Johnston | 342/192 |
| 5,392,050 A | * | 2/1995 | Guerci et al. | 342/90 |
| 6,222,481 B1 | * | 4/2001 | Abrahamson et al. | 342/90 |
| 6,529,157 B1 | * | 3/2003 | Mensa et al. | 342/173 |

OTHER PUBLICATIONS

Acree et al., "Radar detection of missile plumes embedded in elevated atmospheric ducts", Aerospace Applications Conference, 1996 Proceedings., 1996 IEEE, vol. 3, Feb. 3, 1996, pp. 89-103.*
Jiaming et al., "Computation of the RCS of a turbulent plasma cylinder," Radar, 1996. Proceedings., CIE International conference of., Oct. 8, 1996, pp. 582-585.*
Dybdal, Robert B., "Radar Cross Section Measurements", Proceedings of the IEEE, vol. 75, No. 4, Apr. 1987.*

* cited by examiner

*Primary Examiner*—Ian J. Lobo
(74) *Attorney, Agent, or Firm*—Duane Morris, LLP

(57) ABSTRACT

A target missile identifier compares radar cross-section (RCS) information about the missile with a set including at least one template of RCS to make determination(s) of at least one of (a) the missile type (solid/liquid propellant), (b) missile main engine cutoff, andor (c) staging state of a multistage missile.

6 Claims, 3 Drawing Sheets

METHOD FOR DETERMINING MISSILE INFORMATION FROM RADAR RETURNS

GOVERNMENTAL INTEREST

This invention was made with government support under Contract/Grant AEGIS N00024-03-C-6110. The United States Government has a non-exclusive, non-transferable, paid-up license in this invention.

FIELD OF THE INVENTION

This invention relates to the identification of missile type, stage of operation, or both, from a comparison of radar return information with templates of radar cross-section of one or more missile types.

BACKGROUND OF THE INVENTION

Antimissile efforts may use directed-beam weapons, in which the future missile or target location is not of particular interest, as the speed of the beam is so great that the missile motion is irrelevant. In those cases in which antimissile interceptors are used, the interceptor speed is of the same order as that of the target missile, and the estimated future location of the target missile is of great importance. A great deal of effort has been put into antimissile interceptor guidance schemes which predict the future location of the target missile, the interceptor missile, or both, so as to attempt to cause the interceptor to get within a given range of the target missile. These guidance systems require measurements of the target missile so as to determine its current location, and also require estimates of the type of missile, the stage of operation if it is multistage, and its projected trajectory.

It is known that rocket engine or rocket motor plumes are hot, and radiate energy across the entire electromagnetic spectrum. The radiated energy constitutes a signature allowing the rocket engine to be identified or characterized. Different missile systems using either liquid or solid propellant display different infrared (IR) signatures at various altitudes, mach numbers, and aspect angles. These IR signatures have been used for many years to warn of Intercontinental Ballistic Missile (ICBM) launches or to characterize tactical threat systems.

Radar systems have been used for tracking hostile missiles. In general, the radar returns were processed to determine the current location of the hostile missile, and to provide the location information to processors, such as Kalman processors, which attempted to predict the future location of the hostile missile.

SUMMARY OF THE INVENTION

A method according to an aspect of the invention is for determining target missile engine characteristics such as engine solid/liquid propellant and possibly missile type, main engine cutoff (MECO), andor the staging state of a multistage missile. The method comprises the step of preparing a plurality of templates expressing characteristics of the radar cross-section (RCS) of missile engine plumes at various stages of burn of at least one type of missile for which engine cutoff determination is to be made. The missile and its plume, if any, is observed using a radar system, to generate return information including information relating to the hard body of the missile and of its plume. Aspects of the return information are compared with the templates for determining at least one of (a) time of engine cutoff, (b) time of a staging event, and (c) typing of the missile engine. In a particular mode of this method, the step of comparing aspects includes the further step of processing the information relating to the hard body of the missile and of its plume to reduce the level of the hard body information relative to the plume information, to thereby tend to isolate the plume information. In an other mode of the method, the step of preparing a plurality of templates expressing characteristics of the radar cross-section of missile engine plumes at various stages of burn includes the step of preparing a plurality of templates expressing at least the effects on radar cross-section of (a) altitude, (b) missile hard body mach number, and (c) aspect angle. This other mode also includes the step of extracting missile altitude, mach number, and aspect angle from the return information, and the step of comparing aspects of the return information with the templates includes the further step of comparing the plume radar cross-section of the return information with the plume radar cross-section information in at least a plurality of the templates for the known current values of altitude, mach number, and aspect angle, to select that one of the templates with the most likely match of the radar cross-sections.

DESCRIPTION OF THE INVENTION

Figure 1:
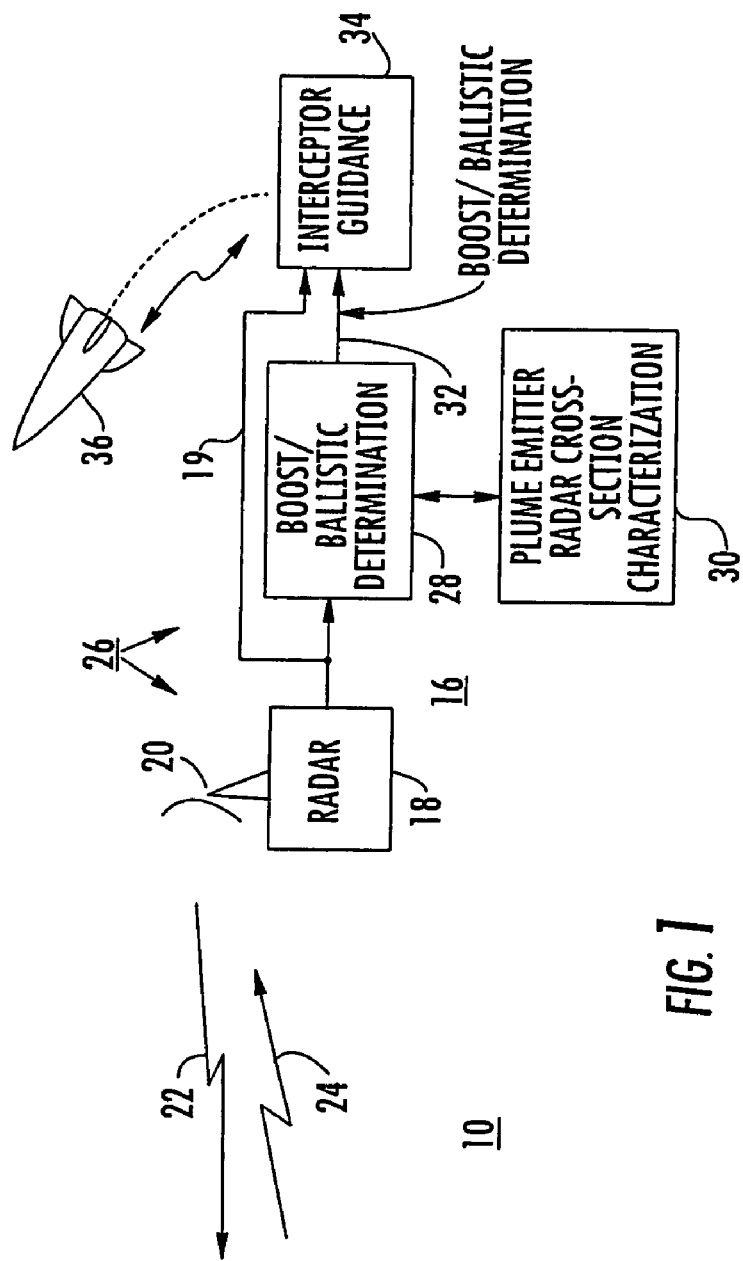
FIG. 1 is a simplified diagram illustrating a system according to an aspect of the invention including a radar sensor, a hostile missile, an interceptor missile, a boost/ballistic determination arrangement, and an interceptor controller using the boost/ballistic determination to aid in interceptor guidance.

FIG. 1 is a simplified diagram illustrating a system according to an aspect of the invention including a radar sensor, a hostile missile, an interceptor missile, a boost/ballistic determination arrangement, and an interceptor controller using the boost/ballistic determination to aid in interceptor guidance. In FIG. 1, the engine or rocket motor of a missile 12 is operating, generating a plume 12*p* of hot gas and particulate combustion products. Operation of the engine propels the missile 12 along a path 14. A system 10 according to an aspect of the invention includes a radar system 18 which includes an antenna illustrated as 20. Radar system 18 transmits electromagnetic signals from antenna 20 toward the region occupied by missile 12, and receives a reflection signal 24. Reflection signal 24 includes a portion of energy reflected by the hard body of missile 12, and a portion reflected by the plume 12*p*.

The radar system 18 of FIG. 1 performs the usual processing of the return signal 24, to produce signals representing the radar cross-section of the entire target 12, 12*p*, and also representing the instantaneous position of the missile 12, both in range, azimuth and elevation. The range, azimuth, and elevation information is coupled by way of a path illustrated as 19 to an interceptor guidance arrangement illustrated as a block 34. Guidance arrangement 34 uses the range and location information to determine the velocity and acceleration of the target missile 12, and controls the flight of an interceptor missile 36 to an impact with the missile target, or if the interceptor missile carries an explosive warhead to within kill distance of the target missile.

It is well known in the art that the control of an interceptor missile is fraught with difficulties. The basic problem is that the interceptor missile must intercept the target missile at a future time, but must be directed toward an interception point which can only be estimated. It is bad enough that the engine of the interceptor missile may burn "hot," "nominal," or "cold," thereby affecting the acceleration, but the burn may change from time to time during the intercept, introducing variables into the estimation of the future position of the interceptor. At least the interceptor is under the control of the defender against the target missile, and its characteristics are known to the controller, and may be monitored. The target missile is not, however, known, so its fundamental characteristics are not initially known. The missile type, and its future locations must be estimated as well as possible. In the case of a target missile which is in a ballistic trajectory (a trajectory controlled by the force of gravity, implying no acceleration due to an engine), the acceleration is due only to gravity and such incidentals as aerodynamic drag, if applicable. In the case of a boosting target missile, the problems are compounded. Initially, not knowing the type of missile means that the nominal thrust and the nominal change of mass as a function of time are unknown, and therefore the acceleration cannot be determined, and the number of engine stages is also not known. These problems may lead to delay in acquiring sufficient information to properly estimate the future locations of the target missile. It will be clear that the chances of successfully intercepting a target missile are improved with early determination of its future locations.

According to an aspect of the invention, an arrangement designated generally as 26 in FIG. 1 uses information relating to the radar cross-section of the target missile to aid in determining or estimating the type of target missile (solid or liquid propellant, for example), the state (ON or OFF) of its engine, and when staging events (transitions between engine operation and non-operation) occurred/will occur.

Arrangement 26 of FIG. 1 includes a boost/ballistic determination processor illustrated as a block 28, and block 28 interacts with a database preloaded with plume emitter radar cross-section (RCS) information illustrated as a block 30.

Figure 2:
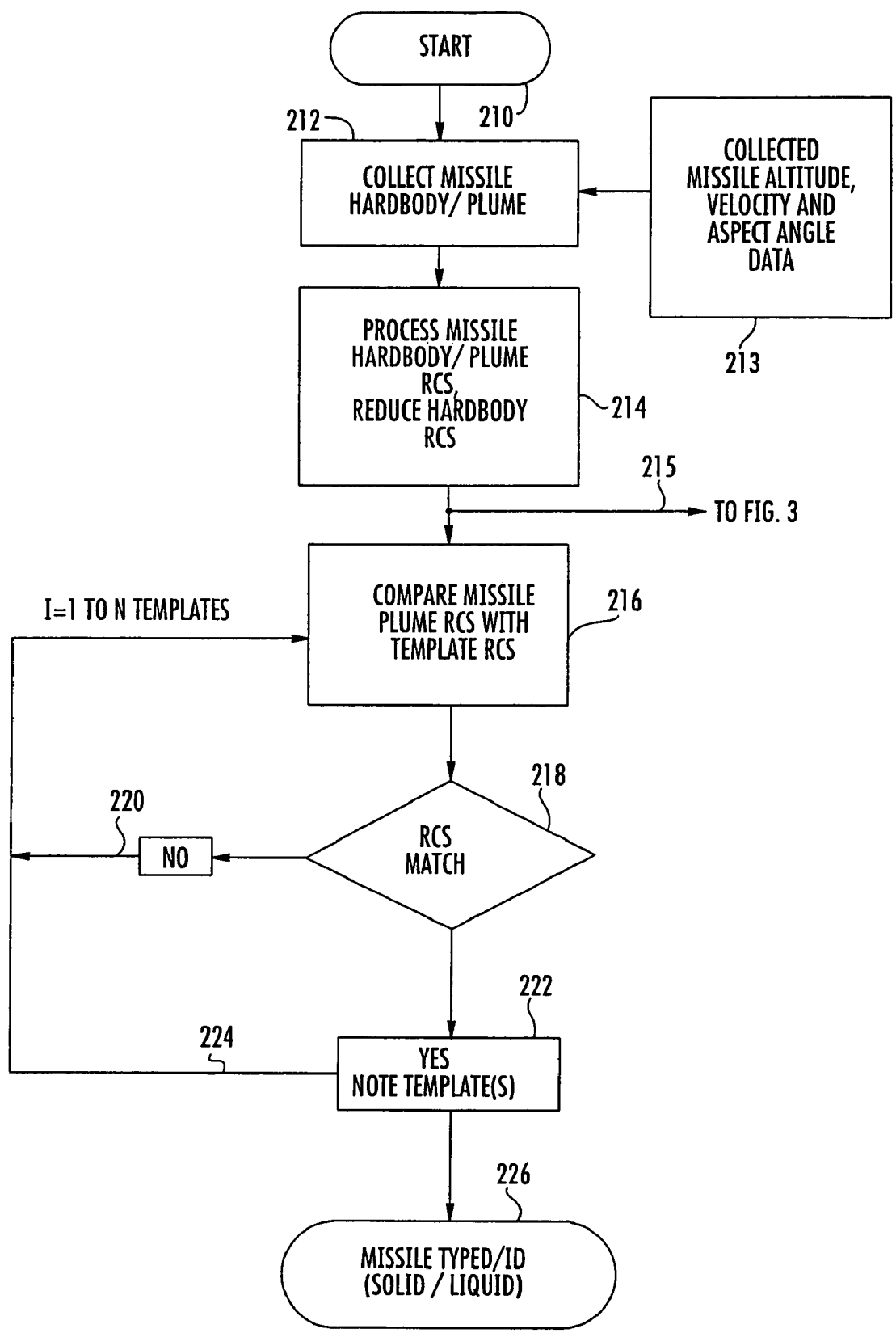
FIG. 2 is a simplified logic chart or diagram illustrating a portion of the logic for making determinations of missile type in the arrangement of FIG. 1.

FIG. 2 is a simplified logic flow chart or diagram illustrating processing steps for making a determination of the target missile type, which is to say whether it is solid or liquid propellant. Under some conditions, it may be able to determine the actual missile type. In FIG. 2, the logic begins at a START block 210, and proceeds to a block 212, which represents the gathering of the radar return information about the radar cross-section of the missile hardbody and plume. From block 212, the logic of FIG. 2 proceeds to a block 214, which represents processing of the hardbody/plume radar cross-section information to reduce the hardbody expression in the return, and to determine its characteristics. Those skilled in the art know several methods for filtering the data to reduce the hardbody contribution to the radar cross-section. Block 216 compares the actual hardbody/plume RCS information, which will ordinarily be RCS range and Doppler information, with template information from block 30 of FIG. 1. A comparison of the characteristics is made for each available template. Block 216 plume RCS templates—Each plume RCS template used in conjunction with block 216 represents one missile and consist of one or more three-dimensional curves, each for a specific radar frequency and trajectory, with axes of Altitude, Mach number and Aspect Angle defining points along the curve. Points on all of these curves correspond to a particular template entry for missile range RCS values, missile Doppler RCS values and a value for the total incoherent RCS. Those skilled in the art know how to make comparisons between data and template data. The currently received RCS information will either substantially match several templates, or it will not match. Those skilled in the art know how to allow substantial matches to be identified, so that exact matching is not needed. Exact matching, if required, would occur so seldom as to reduce the effectiveness of the determination. It is possible to identify the actual missile type if only one template happens to match the actual data.

Block 218 of FIG. 2 represents a decision block, which makes the determination of a match or no match between the currently received RCS information and the template currently being evaluated. If there is no match, decision block 218 routes the logic by its NO output and by way of a path 220 back to block 216, where the currently received RCS information is compared with another template. If there is a match, decision block 218 routes the logic by its YES output and by way of a path 224 back to block 216, where the currently received RCS information is compared with another template. This continues for all templates. Eventually, one or more matches are expected to be found, in which case the logic leaves decision block 218 by the YES path, and proceeds to a completion block 226, in which the particular templates which matched the currently received RCS information are noted. Once the matching templates are identified, it is a simple matter to determine whether the templates are based on a liquid or solid propellant missile type. The missile type (solid or liquid propellant, and possibly the actual missile type can then be reported to the interceptor guidance block 34 of FIG. 1. It should be understood that the target missile RCS information is generated on a continuing basis as the radar system 18 of FIG. 1 illuminates the target missile, so the logic of FIG. 2 can be re-run or cycle as often as desired, with updated RCS information. Thus, even if a single radar illumination is insufficient to provide enough information to determine missile type, the information of subsequent illuminations may be sufficient.

In the logic of FIG. 2, processed missile hardbody/plume radar cross-section (RCS) is available after completion of processing in block 214. At this stage of the logic, the logic may branch to the logic illustrated in FIG. 3, so the logic flows of FIGS. 2 and 3 may operate concurrently. The logic branching from block 214 arrives at block 310 of FIG. 3, and proceeds by way of a logic path 312 to a block 314, which represents engine cut-off analysis, using plume characteristics from a source illustrated as a block 316 and time frequency analysis from a source illustrated as a block 318. Each plume RCS template, as described in conjunction with block 216, represents one missile and comprises one or more three-dimensional curves, each for a specific radar frequency and trajectory, with axes of Altitude, Mach number and Aspect Angle defining points along the curve. Points on all of these curves correspond to a particular template entry for missile range RCS values, missile Doppler RCS values and a value for the total incoherent RCS. Time frequency analysis uses variations in RCS range spread characteristics of the hardbody and plume, and their gradients, as an indication of the ON or OFF state of the engine. The results of the engine cut-off analysis in block 314 are applied to a decision block 322 which routes the logic based on whether the analysis shows that the main engine has cut off. If the main engine has not cut off, the logic leaves decision block 322 by the NO output, and flows by a logic path 324 back to block 310 for another recursion through the logic. If the engine cut-off analysis in block 324 is to the effect that cut-off has occurred, the logic leaves decision block 322 by the YES output, and flows to a main engine cut-off (MECO) declaration block 326. This declaration is used by the interceptor guidance block 34 of FIG. 1 to aid in estimating future locations of the target missile.

Figure 3:
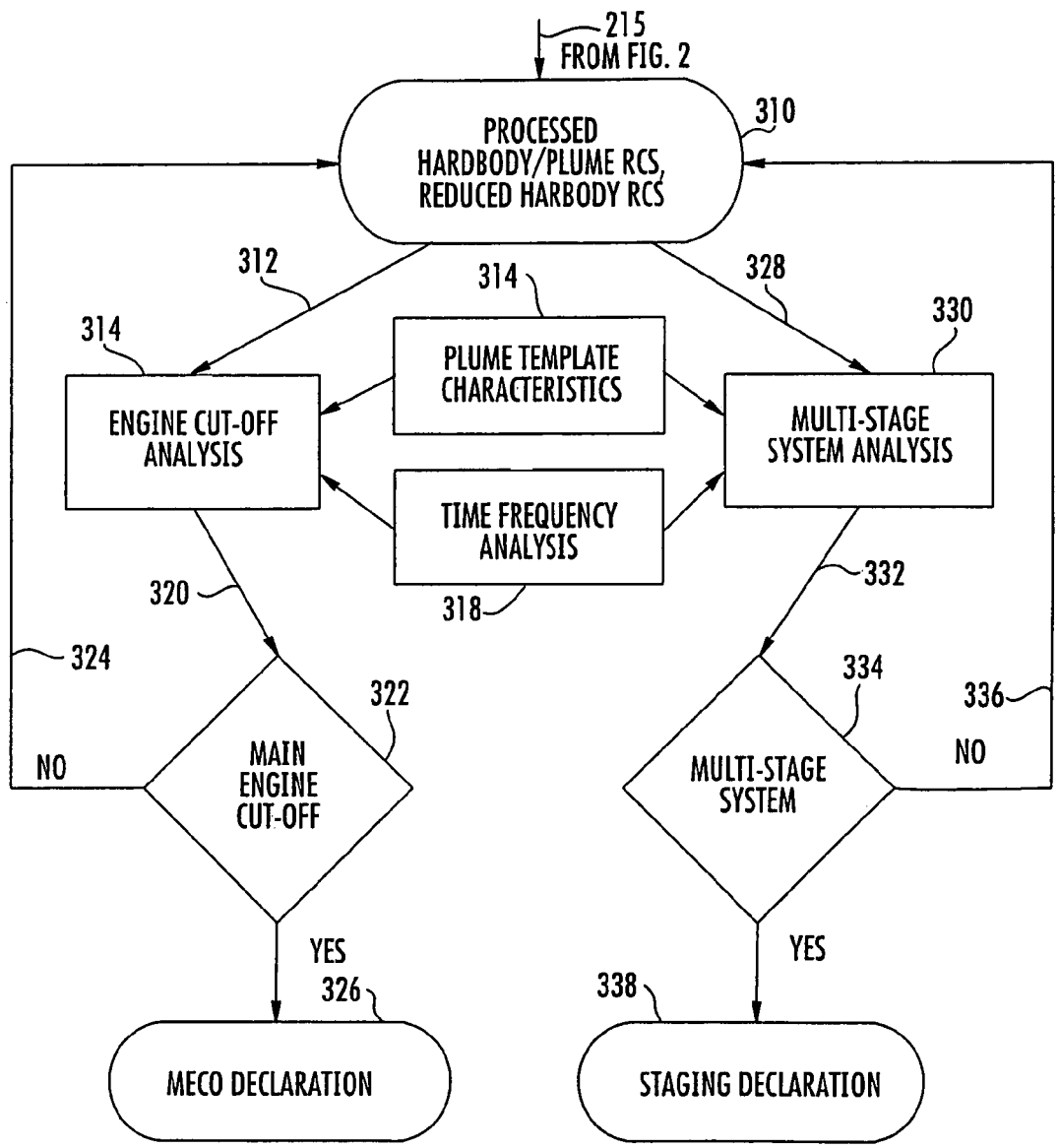
FIG. 3 is a simplified logic chart or diagram illustrating another portion of the logic for use in the arrangement of FIG. 1 for making determinations of main engine cutoff andor staging of a missile.

The logic arriving at block 310 of FIG. 3 also flows by way of a second logic path 328 to a multistage system analysis block 330, which uses plume characteristic templates from block 316 and time frequency analysis from block 318 to determine whether the target missile is single or multistage. In general, one would expect an overall reduction of RCS coming only from the hardbody as the previous stage drops away. As the next-stage engine starts, the level of the RCS would again increase. This process could continue for any number of stages. From analysis block 330, the logic of FIG. 3 flows by way of a logic path 332 to a decision block 334, which routes the logic in dependence upon the decision of analysis block 330. If the decision is that the target missile is a single-stage missile, the logic loops back by way of a logic path 336 to block 310, to begin another iteration. Eventually, a determination may be made that the target missile is of the multistage type, in which case decision block 334 routes the logic to a staging declaration block 338. Staging declaration block will switch from declaring a single-stage missile to declaring a multistage missile when the logic arrives from decision block 334. The staging information is used by interceptor guidance block 34 of FIG. 1 to aid in directing the interceptor missile toward an estimated future position of the target missile.

A method according to an aspect of the invention is for determining target missile (12) engine characteristics, such as solid/liquid propellant and possibly missile type, main engine cut-off (MECO), and staging state in a multistage missile. The method comprises the step of preparing a plurality of templates (30) expressing characteristics of the radar cross-section of missile engine plumes (12p) at various stages of burn of at least one type of missile (12) for which engine characteristics or determination is or are to be made. The missile (12) and its plume (12p), if any, is observed using a radar system (18,20), to generate return information including information relating to the hard body of the missile (12) and of its plume (12p). Aspects of the return information are compared (216,314,330) with the templates (30) for determining at least one of (a) time of engine cutoff, (b) time of a staging event, and (c) typing of the missile engine. In a particular mode of this method, the step of comparing aspects includes the further step of processing (214) the information relating to the hard body of the missile and of its plume to reduce the level of the hard body information relative to the plume information, to thereby tend to isolate the plume information. In an other mode of the method, the step of preparing a plurality of templates (30) expressing characteristics of the radar cross-section of missile engine plumes at various stages of burn includes the step of preparing a plurality of templates (30) expressing at least the effects on radar cross-section of (a) altitude, (b) missile hard body mach number, and (c) aspect angle. This other mode also includes the step of extracting missile altitude, mach number, and aspect angle from the return information, and the step of comparing aspects of the return information with the templates (30) includes the further step of comparing the plume radar cross-section of the return information with the plume radar cross-section information in at least a plurality of the templates (30) for the known current values of altitude, mach number, and aspect angle, to select that one of the templates (30) with the most likely match of the radar cross-sections.

What is claimed is:

1. A method for determining missile engine characteristics, said method comprising the steps of:
preparing a plurality of templates expressing characteristics of the radar cross-section of missile engine plumes at various stages of burn of at least one type of missile;
using a radar system, observing said missile and its associated plume, if any, to generate return information including information relating to the hard body of said missile and of its plume;
comparing aspects of said return information with said templates for determining at least typing of the missile engine.

2. A method according to claim 1, wherein said step of comparing aspects includes the further steps of:
processing said information relating to said hard body of said missile and of its plume to reduce the level of said hard body information relative to said plume information, to thereby tend to isolate said plume information.

3. A method according to claim 1, wherein:
said step of preparing a plurality of templates expressing characteristics of the radar cross-section of missile engine plumes at various stages of burn includes the step of preparing a plurality of templates expressing at least the effects on radar cross-section of (a) altitude and (b) missile hard body mach number;
further comprising the step of extracting missile altitude and Mach number from said return information; and
said step of comparing aspects of said return information with said templates includes the further step of comparing the plume radar cross-section of said return information with the plume radar cross-section information in at least a plurality of said templates for the known current values of altitude and mach number to select that one of said templates with the most likely match of said radar cross-sections.

4. A method according to claim 1, wherein said step of comparing aspects of said return information with said templates includes the steps of:
collecting missile hardbody/plume radar cross-section information to produce current missile information;
selecting one of said templates;
comparing said current missile information with said selected one of said templates, to thereby generate a current information/template comparison result;
if said current information/template comparison result is indicative of a lack of match, selecting another one of said templates, and returning to said step of comparing said current missile information with said selected one of said templates, and if said current information/template comparison result is indicative of a of match, noting the template for which said match occurred; and
reporting the missile type associated with said noted template.

5. A method according to claim 1, wherein said step of preparing a plurality of templates comprises the step of estimating the radar cross-section attributable to only the plume; and
said step of comparing aspects of said return information with said templates comprises the step of reducing the hardbody contribution to the radar cross-section of the current information.

6. A method for determining information about a missile, said method comprising the steps of:
generating radar cross-section information relating to at least one of (a) altitude and (b) missile hard body mach number relating to a plurality of missile types, and storing said information as a plurality of templates;
illuminating a remote missile of interest with a radar for generating current radar cross-section information relating to at least one of (a) altitude and (b) missile hard body mach number of said missile of interest;
comparing said current radar cross-section information relating to at least one of (a) altitude and (b) missile hard body mach number with corresponding ones of said templates to find the best match; and deeming the missile of interest to be of the same type as that by which the particular template giving the best match was made;

wherein said step of generating radar cross-section information relating to a plurality of missile types further comprises the step of estimating the contribution of only the plume of each of said plurality of missile types; and said step of illuminating a remote missile of interest with a radar for generating current radar cross-section information relating to said missile of interest further comprises the step of processing said current radar cross-section information to reduce the contribution of the hardbody of the missile to the radar cross-section.

* * * * *